April 10, 1934. E. J. VALLEN 1,954,656
AUTOMATIC IRIS FOR MOVING PICTURE SCREENS, THEATRICAL DISPLAYS, OR THE LIKE
Filed Jan. 4, 1930 3 Sheets-Sheet 1

INVENTOR.
EARL J. VALLEN
BY Ely & Barrow
ATTORNEYS

April 10, 1934. E. J. VALLEN 1,954,656
AUTOMATIC IRIS FOR MOVING PICTURE SCREENS, THEATRICAL DISPLAYS, OR THE LIKE
Filed Jan. 4, 1930  3 Sheets-Sheet 2

INVENTOR
EARL J. VALLEN
BY
ATTORNEYS

April 10, 1934.　　　　E. J. VALLEN　　　　1,954,656

AUTOMATIC IRIS FOR MOVING PICTURE SCREENS, THEATRICAL DISPLAYS, OR THE LIKE

Filed Jan. 4, 1930　　　3 Sheets-Sheet 3

INVENTOR
Earl J. Vallen

ATTORNEYS

Patented Apr. 10, 1934

1,954,656

UNITED STATES PATENT OFFICE 1,954,656

AUTOMATIC IRIS FOR MOVING PICTURE SCREENS, THEATRICAL DISPLAYS, OR THE LIKE

Earl J. Vallen, Akron, Ohio

Application January 4, 1930, Serial No. 418,488

18 Claims. (Cl. 88—24)

The present invention relates to an automatic device for varying or adjusting the area of a screen upon which pictures or the like are displayed or for controlling curtains in theatrical displays. It is particularly useful in the moving picture field, although the invention is not necessarily so limited and may be employed for other theatrical or display purposes. In describing the invention, the specific application to a moving picture screen will be given.

In the showing of the present day moving pictures, the tendency has been to enlarge the projection area of the screen and quite frequently in the same film or in a series of films the area or the proportions of the projected picture will vary. It has been proposed to provide a shiftable border or shield about the screen which may be adjusted to accommodate varying sizes of pictures, but the operation of the adjustable features of the screen has not been automatic but controlled by the operator, with the result that the adjustment or shifting is not performed timely or automatically nor is it always accurate. This has resulted in unsatisfactory results and has operated against the successful use of screen adjusting devices.

The present invention has for its object the provision of means whereby the opening on the stage is adjusted or shifted automatically, the size and proportion of the opening being governed by the illuminated area from a projector or any other device for illuminating the stage by a shaft of light. It is also one of the objects of the invention to secure adjustment not only of the exposed area but also its proportions.

By the use of the improved apparatus shown and described the change from a large to a small area or vice versa automatically varies the exposed area, the curtains or shields which define the area being shifted to the boundaries of the area of light from the projector. By the same mechanism, a tall or a short picture or opening, a wide or a narrow picture or opening are accommodated with equal facility.

It will be appreciated that the mechanism shown and described is the subject of modification and improvement, and such changes or alterations as may be desired which do not avoid the scope of the invention are intended to be covered herein. It will be understood that, so far as known to me, no previous device has been constructed or disclosed by which the projected light controls the size of the opening in a curtain. By the invention described herein the exposed area is always equal to and correctly proportioned with respect to the projected light, a result not heretofore accomplished. The invention is, therefore, entitled to a broad range of equivalents and is not to be restricted to the details of the mechanism described and illustrated.

In the drawings in which a practical and operative embodiment of the invention is shown:

Figure 1:
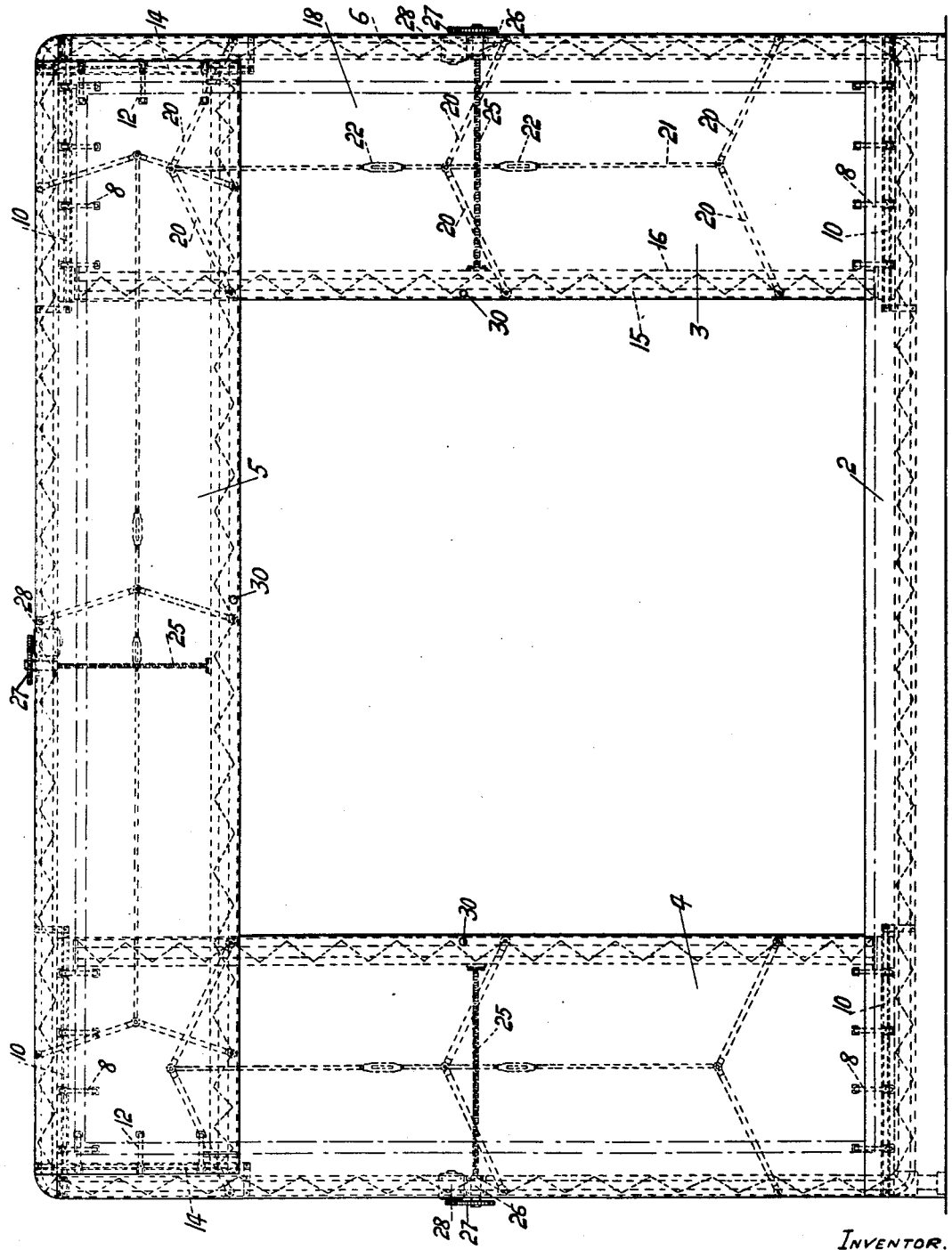
Figure 1 is a front elevation of the automatic iris or screen shown in its reduced position.
Figure 2:
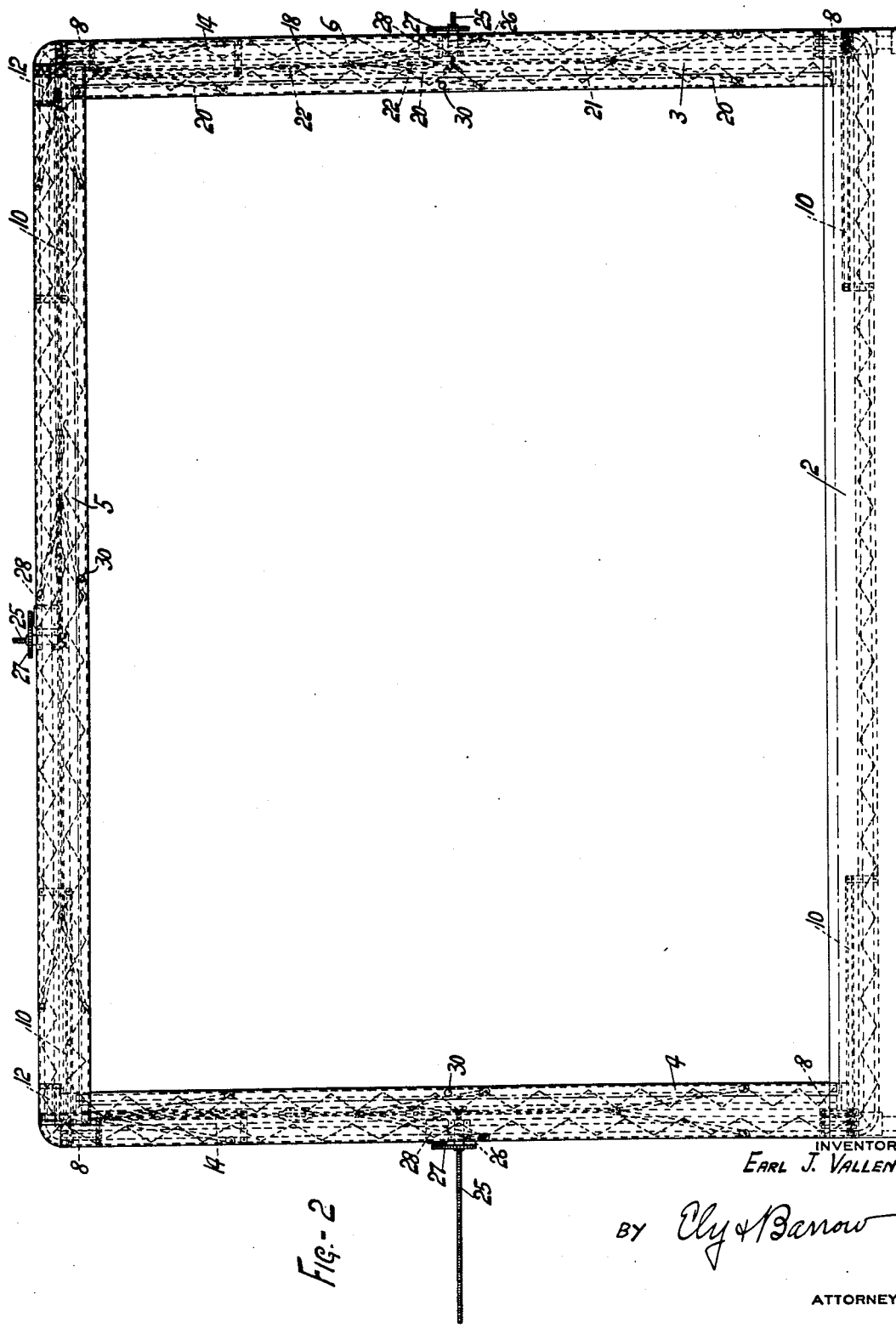
Figure 2 is a similar view showing the iris expanded.
Figure 3:
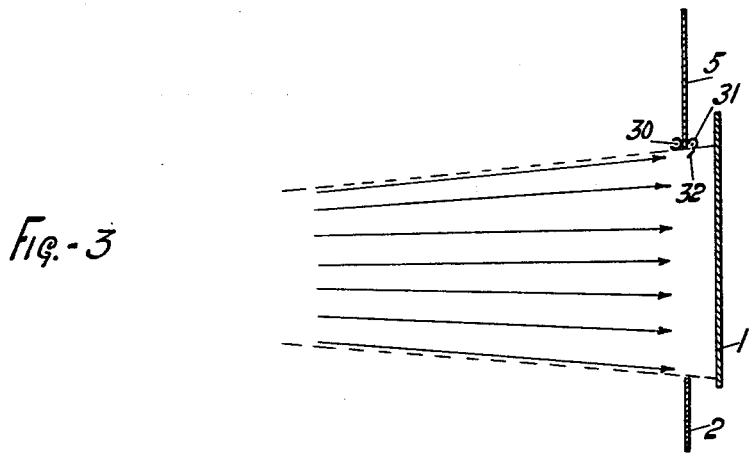
Figure 3 is a sectional view showing the shield or cover for the screen or opening and the means by which its position is controlled.
Figure 4:
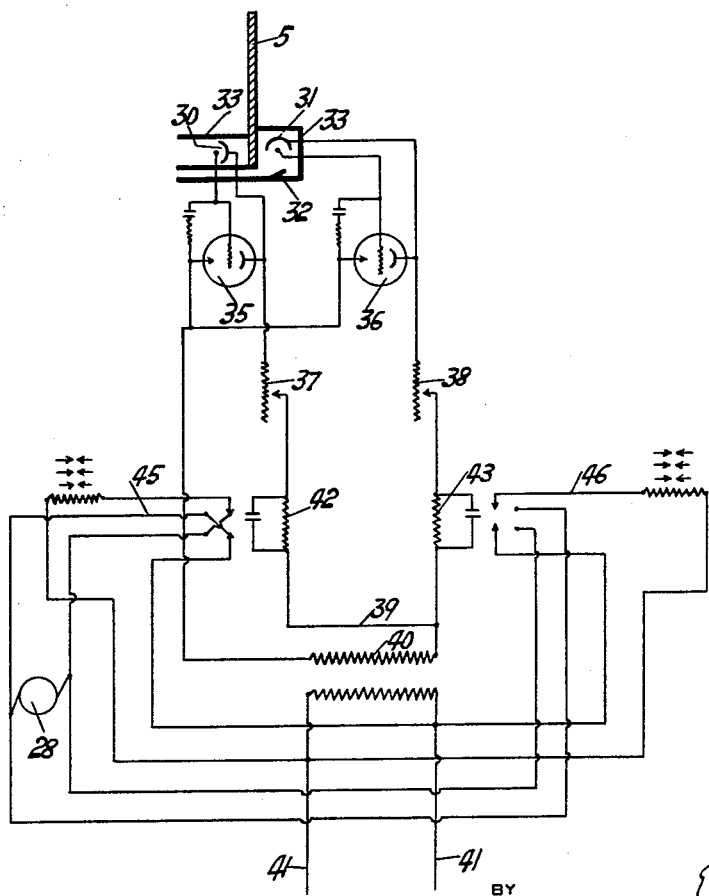
Figure 4 is a diagrammatic view showing the electrical wiring.

In the drawings a screen is shown at 1, being located in the rear of the expansible iris and being of sufficient proportions to take the maximum dimensions of projected pictures.

In front of the screen is arranged the expansible and shiftable curtain or shield, the surfaces of which are dark or light absorbing to outline and define the projection area of the screen and the shield may be of any preferred design, and may be movable or shiftable by any of a number of mechanisms. As shown, it comprises a stationary shield 2 located at the base of the projection area, as it is generally desirable to maintain the lower edge of the picture in a fixed position. The boundaries of the other three sides of the projection area are composed of the two side screens 3 and 4 and the upper screen 5. All of the movable borders or shields are shown as independent of one another so that varying locations and proportions of projection area may be accommodated, and in this manner the picture which is projected will be always properly shown and in register with the boundaries of the exposed screen surface. While the movable shields are shown as providing an opening in their most reduced position, it will be apparent that they may be extended to meet and thus completely cover the screen or opening.

The shiftable borders are supported upon a frame 6 which surrounds the screen and may be attached to any permanent part of the theatre or may be movable if desired. Each of the side shields 3 and 4 is supported by hangers 8 which are movable over horizontal guideways 10 at the top and bottom of the frame and the upper shield is guided by arms 12 movable in the vertical guideways 14.

Each of the shields consists of a rigid border or edge portion 15 which is attached to a frame 16 on the rear thereof so that the edges are not wavy but are maintained in a straight line, while the body of the shield, as at 18, will fall into folds on the retraction of the shield from its foremost position. To move the whole of a shield at equal speeds and avoid diagonal positioning thereof, the outer edge of each shield is connected to the frame or to some rigid part of the device by a series of toggles 20 connected by a central operating link 21, the latter being adjustable between the several toggles, as shown at 22, for the purpose of correcting any misalignment.

For the purpose of moving the shields, any suitable mechanism may be employed, and that shown herein is merely illustrative. Each of the devices is independent of the remaining shields to obtain the maximum flexibility of the apparatus.

To the rigid portion of each of the movable shields is attached a shaft 25 which is screw threaded and is in engagement with a rotating nut or sleeve 26 supported in the frame. This sleeve is driven by gearing 27 from a reversible motor 28 also located on the frame.

The device for controlling automatically the operation of the motor and the location of the screen is the same for each unit of the shield, and it may briefly be described as light responsive elements, which, by suitable electrical connections control the current to the reversible motor so that the motor will respond instantly to the area of the projected light and will expand or contract instantly to correspond thereto. In this way the device shown herein is a truly sensitive iris which expands or contracts in exact conformity to the lighted area.

While other forms of equipment may be employed to secure the desired results, it has been found that the desired result may be accomplished by the employment of cells on the edge of the movable shield which are responsive to light or to the absence of light, thereby setting up a wave or impulse which may be utilized by appropriate relays or the like to control the reversible motor which operates the shield.

The two light responsive cells may be referred to as eyes which are always located at the edge of the lighted area and the instant this lighted area changes, the eyes will automatically find a new position at the edge of the new area.

These eyes are indicated by the numerals 30 and 31, the former being conveniently referred to as a dark eye and the latter a light eye. As the eye 31 is shown in the rear of the shield, a small mirror 32 carried upon the shield will direct the light rays into the eye. Each eye is surrounded by shutters 33 which prevent the operation of the device by stray light rays.

The cells which are used in the present device are known as electric eyes and are photo-ionic light cells or selenium eyes and are sensitive to light or to an absence of light. The dark eye 30 in the present device is responsive to light and the light eye 31 is responsive to the absence of light.

The eye 30 is connected to a grid glow or amplifier tube 35, and the eye 31 is connected to a grid glow or amplifier tube 36. These tubes are connected respectively through adjustable rheostats 37 and 38 to a low voltage line 39 which is energized through a transformer 40 from the main power lines 41. In the line 39 leading to the tube 35 is located a primary relay 42, and in the line leading to the tube 36 is located a primary relay 43. The relay 42 opens or closes the circuit 45 which operates the motor 28 in one direction while the relay 43 opens or closes the circuit 46 which operates the motor in the opposite direction.

The operation of the mechanism may be briefly described as follows:

Assuming that the shields are in their innermost position so as to enclose a small screen area or opening in the curtain, the light rays at the border of the opening are conducted to the eye 31, while the eye 30 is in darkness. In this condition the circuits to the motor are open. If now the lighted area is enlarged the eye 30 is lighted and the wave or impulse is set up in the tube 35, which actuates the relay 42, and the motor is started in the direction to withdraw the shield and this movement continues until the eye 30 is again plunged into darkness at the border of the enlarged light area. If now the size of the projected area be reduced, the eye 31 is within the unlighted area around the reduced position and the impulse through the tube 36 is transmitted to the relay 43 and the motor started in the reverse direction to bring the shield into register with the picture or shaft of light.

If there is a slight tendency for the shield to drift by momentum past its proper position, this is corrected by the other electrical eye so that it comes to rest at the border of the picture.

As there is no sharp line of demarcation between the illuminated and unilluminated areas the eye 30 and the mirror which focuses the light on the eye 31 are either spaced far enough apart to exclude the diffusion area lying between the positive and negative areas or the shield between the two passages for the light is broad enough to take care of that situation.

It will be seen that an entirely new and very useful combination of elements has been provided which, using the properties of the electric eyes affords a system of automatic control for the iris. It is possible to vary the areas of the opening or its proportions, or to shift the location of the opening, any of which conditions are automatically responded to by the mechanism which has been shown. While one form of shield is shown, any form of curtain may be employed for the purpose and the shields may be located at any point, a fourth movable shield at the lower edge of the screen being utilized if found desirable. The invention broadly consists in the automatic control of the effective area of the opening in accordance with the area of the projected light, and as this is broadly new, the intention is to cover the same in any form. One skilled in the arts to which this invention is directed may be able to devise other specific means of accomplishing the results without departing from the essential features of the invention.

What is claimed is:

1. In a shield for moving picture screens, a shiftable border to vary the area of the opening in the shield, an element responsive to light projected toward the opening and positioned at the edge of said opening, and mechanism controlled by said element to shift the border into substantial register to the boundary of the projected light.

2. In a shield for moving picture screens, a shiftable border to vary the area of the opening in the shield, an element responsive to light projected toward the opening, said element being carried by the border, and mechanism for moving the shield controlled by the element.

3. A movable shield defining an opening for theatrical displays, an element responsive to light and an element responsive to darkness, said elements being carried at the edge of the shield, and a reversible shield mover controlled by said elements and having an operative connection with the shield.

4. A movable shield for theatrical displays, a reversible motor for operating the shield, an element responsive to light outside of the projected area and an element responsive to absence of light inside of the projected area, and means operable by said elements respectively to energize the motor in opposite directions.

5. A movable shield for theatrical displays, a reversible motor for operating the shield, an element responsive to light located outside of the projected area and an element responsive to absence of light located inside of the projected area, said elements being carried upon the shield, and means operable by said elements respectively to energize the motor in opposite directions.

6. An iris having a border movable toward and from the center and defining an opening for theatrical displays, and light responsive means to control the area of the opening in the iris by the area of light projected against it.

7. An expansible and contractible iris defining an opening, and automatic means to control the position of the iris, said means being governed by the area of light projected through the opening thereof.

8. An expansible and contractible iris defining an opening, and light responsive means for moving the iris either to expand or contract the opening thereof, said means being controlled by the area of light projected against the iris.

9. The combination of a screen, means to vary the effective area thereof, and light-responsive control mechanism therefor operated by the area of light projected onto the screen.

10. The combination of a screen, and means to bring the effective area of the screen in register with the area of light projected thereon, said means being responsive directly to the light conditions in and outside of the effective area.

11. The combination of a screen, means to bring the exposed area of the screen in register with the light area to be intercepted thereby, and light sensitive elements located within and outside of the exposed area and having operative connections with said means.

12. The combination of a screen, an iris over the screen and defining an opening, and means for automatically reducing, expanding or varying the proportions of said opening in response to the area of light projected onto the screen.

13. The combination of a screen, an iris over the screen defining the exposed area thereof, light sensitive elements located at the edge of the iris, and means for opening and closing the iris operative upon shifting of the edge of the light projected area.

14. The combination of a screen, an iris over the screen defining the exposed area thereof, an element responsive to light outside of the iris opening, and an element responsive to darkness inside the iris, and means for expanding or contracting the iris operated by the elements.

15. The combination of a screen having adjustable boundaries which define its effective area, and means for bringing the boundaries of the screen into register with the boundaries of the picture upon the screen, said means comprising elements sensitive respectively to conditions of light and darkness, and located inside and outside of the boundaries of the screen.

16. The combination of a screen having adjustable boundaries which define its effective area, and means for bringing the boundaries of the screen into register with the boundaries of the picture upon the screen, said means comprising photo-electrical devices responsive respectively to light and darkness located on opposite sides of the boundaries of the screen.

17. The combination of a screen having adjustable boundaries which define its effective area, means for bringing the boundaries of the screen into register with the boundaries of the picture upon the screen, said means comprising photo-electrical devices responsive respectively to conditions of light and darkness located on opposite sides of the boundaries of the screen, and connections controlled by the action of said devices to shift screen boundaries.

18. Apparatus including a movable member, a motor for moving said member, an electrical means for controlling said motor, said electrical means including a pair of photo-sensitive elements movable as a unit with movement of said member, said elements being so connected in said electrical control means whereby power connections are established to said motor to operate the same in one direction when both of said elements are exposed to light and power connections are established to said motor to operate it in an opposite direction when both of said elements are exposed to darkness and whereby said motor is disconnected from the source of its power when one of said elements is exposed to light and the other is exposed to darkness, means for so projecting light toward said elements as normally to maintain said elements in a condition in which one of said elements is exposed to light and the other to darkness, and means to cause said light to shift in one direction or the other respecting said elements to tend to expose both of said elements to light or both to darkness, said elements causing movement of the said member in accordance with movement of the light respecting said elements whereby said movement is in a direction tending to maintain said normal condition.

EARL J. VALLEN.